US006775917B1

(12) United States Patent
Campbell

(10) Patent No.: US 6,775,917 B1
(45) Date of Patent: Aug. 17, 2004

(54) ADJUSTABLE ANGLE CUTTING JIG DEVICE AND METHOD OF USING

(76) Inventor: James L. Campbell, P.O. Box 57, Germantown, KY (US) 41044

( * ) Notice: Subject to any disclaimer, the term of this patent is extended or adjusted under 35 U.S.C. 154(b) by 0 days.

(21) Appl. No.: 10/392,773

(22) Filed: Mar. 20, 2003

(51) Int. Cl.[7] ................................................ B23Q 17/22

(52) U.S. Cl. ............................ 33/640; 33/415; 33/430; 33/471; 33/568; 83/435.12; 83/435.13; 83/435.14

(58) Field of Search .......................... 33/415, 430, 435, 33/465, 471, 534, 538, 626, 628, 630, 640, 641, 568, 569, 573; 83/409, 409.1, 425, 435.11, 435.12, 435.13, 435.14, 437.1

(56) References Cited

U.S. PATENT DOCUMENTS

| | | | | | |
|---|---|---|---|---|---|
| 2,679 | A | * | 6/1842 | Redheffer | 83/409 |
| 1,831,124 | A | * | 11/1931 | Koster | 83/435.12 |
| 2,696,854 | A | * | 12/1954 | Woodruff | 83/435.14 |
| 3,261,099 | A | * | 7/1966 | Blake | 33/435 |
| 4,884,604 | A | * | 12/1989 | Rice et al. | 33/538 |
| 4,977,938 | A | * | 12/1990 | Greeson | 83/574 |
| 5,187,877 | A | * | 2/1993 | Jory et al. | 33/640 |
| D351,774 | S | * | 10/1994 | Witt | D8/71 |
| 5,533,556 | A | * | 7/1996 | Whitney | 33/415 |
| 5,771,767 | A | * | 6/1998 | Itami | 83/435.13 |
| 6,039,095 | A | * | 3/2000 | Newman | 144/144.52 |
| 6,105,268 | A | * | 8/2000 | Vaughn et al. | 33/471 |
| 6,138,372 | A | * | 10/2000 | Newman | 33/638 |

* cited by examiner

*Primary Examiner*—Diego Gutierrez
*Assistant Examiner*—Madeline Gonzalez

(57) ABSTRACT

An adjustable angle cutting jig device and associated method of using the device for use with a table saw having a circular blade, a rip fence and a miter groove is disclosed. The device comprising the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp. The method of using comprises the steps of adjoining, affixing, aligning, angling, cutting, fastening, grabbing, identifying, inserting, loosening, obtaining, placing, pushing, raising, sliding, tightening, turning, and untightening.

18 Claims, 3 Drawing Sheets

ADJUSTABLE ANGLE CUTTING JIG DEVICE AND METHOD OF USING

FIELD OF THE INVENTION

The present invention relates to woodworking tools and, more specifically, to an easily adjustable, lightweight adjustable angle cutting jig device and associated method of using the device on a table saw to cut various angles without altering the angle of the table saw blade.

DESCRIPTION OF THE PRIOR ART

Woodworking tools, such as table saws, radial arm saws, drill presses, routers, jigsaws and the like frequently require cuts or other woodworking operations to take place on a piece of wood at various angles. Miter accessories have been developed for use with at least some of these tools. For table saws, some such miter accessories have been developed in the form of protractor-like attachments, typically placed on a guide bar, which moves in a machined slot on the table saw top or the like. A fence assembly is attached to the protractor apparatus to set the fence to various angles. A lock knob generally holds the fence in position. Some miter gauges of this type include built-in stops for permitting quick setting to the more commonly used angles. Additional accessories in the form of extensions on the fence, with movable stop members on them, are available to permit the cutting of multiple pieces of wood to the same lengths. Protractor miter gauges generally are relatively small (typically, having a radius of 6 inches to 10 inches or so), so that care must be taken to accurately position the fence for achieving the miter cuts desired. Since miter gauges of this type require a machined slot on the table saw top or router tabletop, they also are not suitable for tools which do not typically include a movable fence, such as radial arm saws and drills.

In addition to the relatively limited use which may be achieved by standard protractor-like miter gauges, such gauges also are relatively expensive, since they require a precision protractor, along with various configurations of fences and the like. Also, most protractor type miter gauges include several different parts, all of which must be accurately assembled together and accurately machined if the miter gauge is to be used in any type of precision work.

A wide variety of jigs is currently available on the commercial market and an even larger number of these types of devices arc known in the art of jigs, for example, the craftsman's adjustable angle instrument disclosed by Jory and Fay in U.S. Pat. No. 5,187,877; the angle attachment for woodworking tools disclosed by Itami in U.S. Pat. No. 5,771,767; the miter guide disclosed by Osborne in U.S. Pat. No. 5,979,283; the angle measuring device disclosed by Matzo and Skultety-Betz in U.S. Pat. No. 6,104,480; the adjustable carpentry angle apparatus disclosed by Hathaway in U.S. Pat. No. 6,105,267; and the jig for cutting tile disclosed by Stabb in U.S. Pat. No. D244,746.

While all of the above-described devices fulfill their respective, particular objectives and requirements, the aforementioned patents do not describe an adjustable angle cutting jig device having the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp. This combination of elements would specifically match the user's particular individual needs of making it possible to perform the steps of adjoining, affixing, aligning, angling, cutting, fastening, grabbing, identifying, inserting, loosening, obtaining, placing, pushing, raising, sliding, tightening, turning, and untightening. The above-described patents make no provision for an adjustable angle cutting jig device having the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp.

Therefore, a need exists for a new and improved adjustable angle cutting jig device having the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp. In this respect, the adjustable angle cutting jig device according to the present invention substantially departs from the conventional concepts and designs of the prior art, and in doing so provides an apparatus primarily developed for the purpose of providing a means for performing the steps of adjoining, affixing, aligning, angling, cutting, fastening, grabbing, identifying, inserting, loosening, obtaining, placing, pushing, raising, sliding, tightening, turning, and untightening.

SUMMARY OF THE INVENTION

The present device and method of using, according to the principles of the present invention, overcomes the shortcomings of the prior art by providing an adjustable angle cutting jig device and method of using are disclosed. The device comprising the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp. The method of using comprises the steps of adjoining, affixing, aligning, angling, cutting, fastening, grabbing, identifying, inserting, loosening, obtaining, placing, pushing, raising, sliding, tightening, turning, and untightening.

In view of the foregoing disadvantages inherent in the known type adjustable angle cutting jig devices now present in the prior art, the present invention provides an improved adjustable angle cutting jig device, which will be described subsequently in great detail, is to provide a new and improved adjustable angle cutting jig device which is not anticipated, rendered obvious, suggested, or even implied by the prior art, either alone or in any combination thereof.

To attain this, the present invention essentially comprises the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp.

There has thus been outlined, rather broadly, the more important features of the invention in order that the detailed description thereof that follows may be better understood, and in order that the present contribution of the art may be better appreciated.

The invention may also include a miter rail attached to the cross member, wherein the miter rail is dimensioned to slidably fit within the miter groove of the table saw. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

It is therefore an object of the present invention to provide a new and improved adjustable angle cutting jig device that has all the advantages of the prior art adjustable angle cutting jig device and none of the disadvantages.

It is another object of the present invention to provide a new and improved adjustable angle cutting jig device that may be easily and efficiently manufactured and marketed.

An even further object of the present invention is to provide a new and improved adjustable angle cutting jig device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new adjustable angle cutting jig device that provides in the apparatuses and methods of the prior art some of the advantages thererof, while simultaneously overcoming some of the disadvantages normally associated therewith.

Even still another object of the present invention is to provide a adjustable angle cutting jig device having the interconnected elements of a rip fence guide, a first shank, a second shank, a cross member, a first rotating arm, a first threaded bolt, a second rotating arm, a second threaded bolt, cross brace, a first angle guide, a first wingnut, a second angle guide, a second wingnut, and at least one clamp. This combination of elements makes it possible to perform the steps of adjoining, affixing, aligning, angling, cutting, fastening, grabbing, identifying, inserting, loosening, obtaining, placing, pushing, raising, sliding, tightening, turning, and untightening Lastly, it is an object of the present invention to provide a new and improved method of using comprising the steps of adjoining, affixing, aligning, angling, cutting, fastening, grabbing, identifying, inserting, loosening, obtaining, placing, pushing, raising, sliding, tightening, turning, and untightening.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
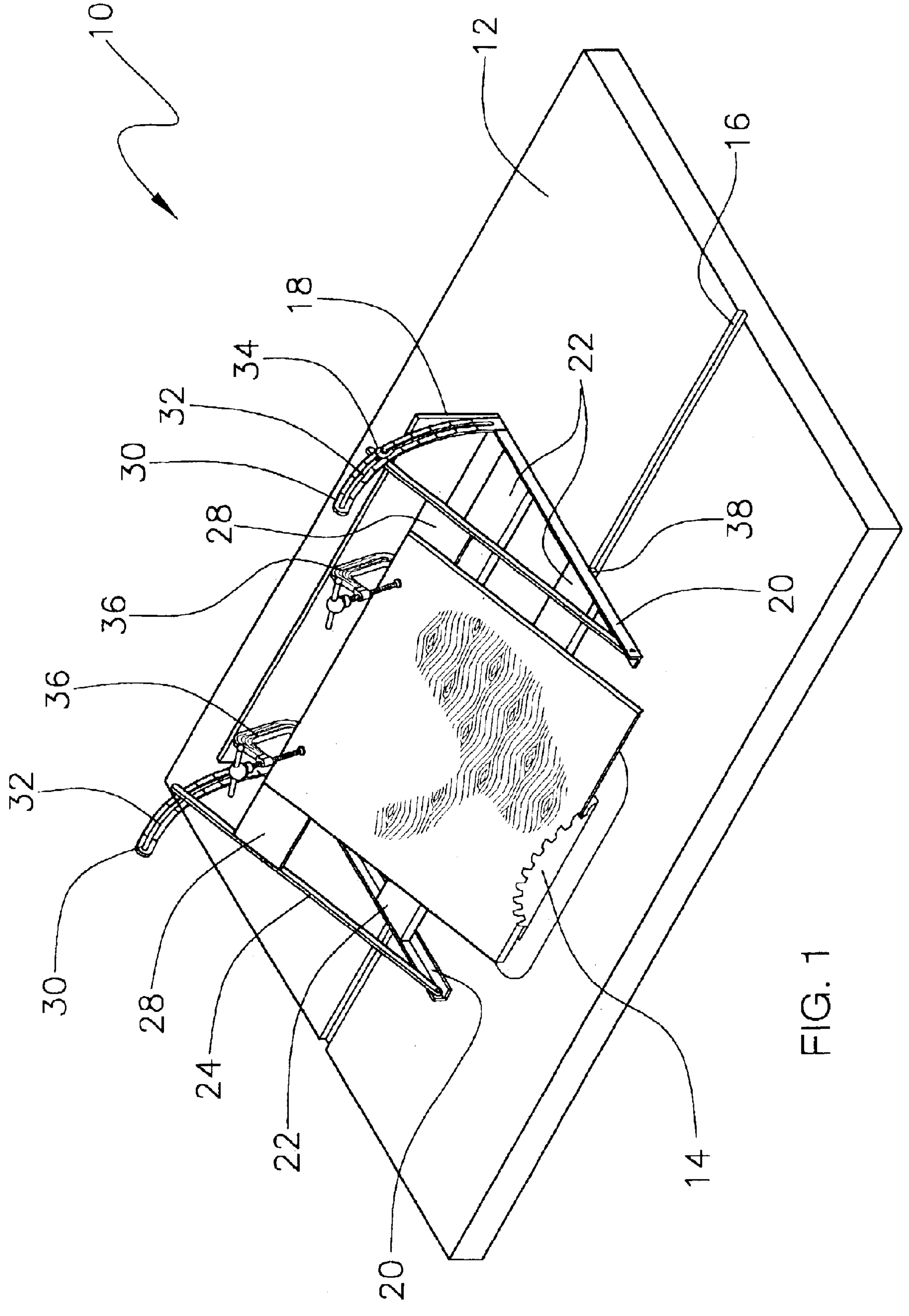
FIG. 1 is a perspective view of a preferred embodiment of the adjustable angle cutting jig device constructed in accordance with the principles of the present invention.

Referring now to the drawings, and in particular FIG. 1 to 4 thereof, one preferred embodiment of the present invention is shown and generally designated by the reference numeral 10. One preferred embodiment of an adjustable angle cutting jig device 10 for use with a table saw 12 having a circular blade 14, a rip fence and a miter groove 16, the device 10 comprising: a rip fence guide 18, a first shank 20, a second shank 20, a cross member 22, a first rotating arm 24, a first threaded bolt 26, a second rotating arm 24, a second threaded bolt 26, cross brace 28, a first angle guide 30, a first wingnut 34, a second angle guide 30, a second wingnut 34, and a clamp 36. The rip fence guide 18 has a first end, a second end and a back surface. The first shank 20 has a distal and proximate end, the proximate end of the first shank 20 is attached to the first end of the rip fence guide 18, the first shank 20 and the rip fence guide 18 are disposed substantially perpendicular to each other. The second shank 20 has a distal and proximate end, the proximate end of the second shank 20 is attached to the second end of the rip fence guide 18, the second shank 20 and the rip fence guide 18 are disposed substantially perpendicular to each other, the first and second shank 20 are disposed substantially parallel to each other. The cross member 22 is attached to the first and second shanks 20. The first rotating arm 24 has a distal and proximate end, in which the distal end of the first rotating arm 24 is pivotally attached to the distal end of the first shank 20. The first threaded bolt 26 is attached to the proximate end of the first rotating arm 24. The second rotating arm 24 has a distal and proximate end, in which the distal end of the second rotating arm 24 is pivotally attached to the distal end of the second shank 20. The second threaded bolt 26 is attached to the proximate end of the second rotating arm 24. The cross brace 28 is attached to the first and second rotating arms 24, wherein the first and second rotating arms 24 are disposed parallel to each other. The first angle guide 30 has a distal end, a proximate end and a first collar, in which the proximate end of the first angle guide 30 is attached to the proximate end of the first shank 20, wherein the first collar defines a first curved hole 32, wherein the first threaded bolt 26 attached to the proximate end of the first rotating arm 24 is slidably engaged within the first curved hole 32 of the first angle guide 30. The first wingnut 34 is threadedly attached to the first threaded bolt 26. The second angle guide 30 has a distal end, a proximate end and a second collar, in which the proximate end of the first angle guide 30 is attached to the proximate end of the second shank 20, so that the second collar defining a second curved hole 32, wherein the second threaded bolt 26 attached to the proximate end of the second rotating arm 24 is slidably engaged within the second curved hole 32 of the second angle guide 30. The second wingnut 34 is threadedly attached to the second threaded bolt 26. The clamp 36 is used to hole a wooden board securely to the device 10.

An optional miter rail 38 may be added to the device 10 in which the miter rail 38 is attached to the cross member 22, wherein the miter rail 38 dimensioned to slidably fit within the miter groove 16 of the table saw 12.

An optional second clamp 36 may be added to the device 10 to be used to further secure the wooded board to the device 10.

An optional second cross member 22 may be added to the device 10 wherein the second cross member 22 is attached to the first and second shanks 20.

The clamp may be any commercially available clamping device in which the clamp 36 is selected from the group consisting of a C-clamp 36, a bar clamp 36, a vice clamp 36, a spring clamp 36, a ratchet clamp 36, and a pinch clamp 36.

The first angle guide 30 may be any commercially available angle guide 30. One preferred configuration of the first angle guide 30 is that it has a first facade with a first plurality of angular demarcations embossed the first facade.

The second angle guide 30 may be any commercially available angle guide 30. One preferred configuration of the second angle guide 30 is that it has a second facade with a second plurality of angular demarcations embossed the second facade.

The cross member 22 may be made of any commercially available material such as hardwoods selected from the group consisting of ash, walnut, oak, maple, elm, cherry, and poplar.

The cross brace 28 may be made of any commercially available material such as hardwoods selected from the group consisting of ash, walnut, oak, maple, elm, cherry, and poplar.

The rip fence guide 18 may be made of any commercially available material such as hardwoods selected from the group consisting of ash, walnut, oak, maple, elm, cherry, and poplar.

Another preferred embodiment of the adjustable angle cutting jig device 10 consist essentially of: a rip fence guide 18, a first shank 20, a second shank 20, a first and a second cross member 22, a first rotating arm 24, a first threaded bolt 26, a second rotating arm 24, a second threaded bolt 26, cross brace 28, a first angle guide 30, a first wingnut 34, a second angle guide 30, a second wingnut 34, a first and a second clamp 36, and a miter rail 38. The rip fence guide 18 has a first end, a second end and a back surface. The first shank 20 has a distal and proximate end, the proximate end of the first shank 20 is attached to the first end of the rip fence guide 18, the first shank 20 and the rip fence guide 18 are disposed substantially perpendicular to each other. The second shank 20 has a distal and proximate end, the proximate end of the second shank 20 is attached to the second end of the rip fence guide 18, the second shank 20 and the rip fence guide 18 are disposed substantially perpendicular to each other, the first and second shank 20 are disposed substantially parallel to each other. The first and second cross members 22 are attached to the first and second shanks 20. The first rotating arm 24 has a distal and proximate end, in which the distal end of the first rotating arm 24 is pivotally attached to the distal end of the first shank 20. The first threaded bolt 26 is attached to the proximate end of the first rotating arm 24. The second rotating arm 24 has a distal and proximate end, in which the distal end of the second rotating arm 24 is pivotally attached to the distal end of the second shank 20. The second threaded bolt 26 is attached to the proximate end of the second rotating arm 24. The cross brace 28 is attached to the first and second rotating arms 24, wherein the first and second rotating arms 24 are disposed parallel to each other. The first angle guide 30 has a distal end, a proximate end and a first collar, in which the proximate end of the first angle guide 30 is attached to the proximate end of the first shank 20, wherein the first collar defines a first curved hole 32, wherein the first threaded bolt 26 attached to the proximate end of the first rotating arm 24 is slidably engaged within the first curved hole 32 of the first angle guide 30. The first wingnut 34 is threadedly attached to the first threaded bolt 26. The second angle guide 30 has a distal end, a proximate end and a second collar, in which the proximate end of the first angle guide 30 is attached to the proximate end of the second shank 20, so that the second collar defining a second curved hole 32, wherein the second threaded bolt 26 attached to the proximate end of the second rotating arm 24 is slidably engaged within the second curved hole 32 of the second angle guide 30. The second wingnut 34 is threadedly attached to the second threaded bolt 26. The first and second clamps 36 are used to hole a wooden board securely to the device 10. The miter rail 38 is attached to the cross member 22, in which the miter rail 38 dimensioned to slidably fit within the miter groove 16 of the table saw 12.

One preferred embodiment of a method of using an adjustable angle cutting jig device 10 for use with a table saw 12 having a circular blade 14, a rip fence and a miter groove 16, the method comprising the steps of: adjoining, affixing, aligning, angling, cutting, fastening, grabbing, identifying, inserting, loosening, obtaining, placing, pushing, raising, sliding, tightening, turning, and untightening. The obtaining step comprises obtaining the device 10 consisting essentially of: a rip fence guide 18 having a first end, a second end and a back surface; a first shank 20 having a distal and proximate end, the proximate end of the first shank 20 is attached to the first end of the rip fence guide 18, the first shank 20 and the rip fence guide 18 are disposed substantially perpendicular to each other; a second shank 20 having a distal and proximate end, the proximate end of the second shank 20 is attached to the second end of the rip fence guide 18, the second shank 20 and the rip fence guide 18 are disposed substantially perpendicular to each other, the first and second shank 20 are disposed substantially parallel to each other, a first cross member 22 attached to the first and second shanks 20; a second cross member 22 attached to the first and second shanks 20; a first rotating arm 24 having a distal and proximate end, the distal end of the first rotating arm 24 is pivotally attached to the distal end of the first shank 20, a first threaded bolt 26 attached to the proximate end of the first rotating arm 24; a second rotating arm 24 having a distal and proximate end, the distal end of the second rotating arm 24 is pivotally attached to the distal end of the second shank 20; a second threaded bolt 26 attached to the proximate end of the second rotating arm 24; a cross brace 28 attached to the first and second rotating arms 24, wherein the first and second rotating arms 24 are disposed parallel to each other; a first angle guide 30 having a distal end, a proximate end and a first collar, the proximate end of the first angle guide 30 is attached to the proximate end of the first shank 20, the first collar defining a first curved hole 32, wherein the first threaded bolt 26 attached to the proximate end of the first rotating arm 24 is slidably engaged within the first curved hole 32 of the first angle guide 30; a first wingnut 34 threadedly attached to the first threaded bolt 26; a second angle guide 30 having a distal end, a proximate end and a second collar, the proximate end of the first angle guide 30 is attached to the proximate end of the second shank 20, the second collar defining a second curved hole 32, wherein the second threaded bolt 26 attached to the proximate end of the second rotating arm 24 is slidably engaged within the second curved hole 32 of the second angle guide 30; a second wingnut 34 threadedly attached to the second threaded bolt 26; and a first clamp 36; a second clamp 36; and a miter rail 38 attached to the cross member 22, the miter rail 38 dimensioned to slidably fit within the miter groove 16 of the table saw 12. The inserting step comprises inserting the miter rail 38 of the device 10 into the miter groove 16 of the table saw 12. The sliding step comprises sliding the rip fence of the table saw 12 against the rip fence guide 18 of the device 10. The identifying step comprises identifying a wooden board to be cut at a desired angle. The loosening step comprises loosening the first wingnut 34 from the first bolt 26 so that the first rotating arm 24 is free to pivot. The untightening step comprises untightening the second wingnut 34 from the second bolt 26 so that the second rotating arm 24 is free to pivot. The grabbing step comprises grabbing hold of the brace 28 member when the first wingnut 34 is loosened and when the second wingnut 34 is untightened. The angling step comprises angling pivotally the first rotating arm 24 to the desired angle. The aligning step comprises aligning pivotally the second rotating arm 24 to the desired angle. The fastening step comprises fastening the first wingnut 34 to the first bolt 26 when the first rotating arm 24 is angled at the desired angle so that the proximate end of the first rotating arm 24 is firmly secured to the first angle guide 30. The tightening step comprises tightening the second wingnut 34 to the second bolt 26 when the second rotating arm 24 is aligned at the desired angle so that the proximate end of the second rotating arm 24 is firmly secured to the second angle guide 30. The raising step comprises raising the blade 14 on the table saw 12. The placing step comprises placing the board flush onto the brace 28 of the device 10. The adjoining step comprises adjoining securely the board flush onto the brace 28 of the device 10 with the first clamp 36. The affixing step comprises affixing securely the board flush onto the brace 28 of the device 10 with the second clamp 36. The turning step comprises turning on the table saw 12 so that the blade 14 rotates. The pushing step comprises pushing the device 10 with the board adjoined and affixed securely to the brace 28 when the the miter rail 38 of the device 10 is inserted into the miter groove 16 of the table saw 12 and when the rip fence of the table saw 12 is slid against the rip fence guide 18 of the device 10. The cutting step comprises cutting the board at the desired angle when the device 10 is pushed.

Referring now to FIG. 1 which depicts a perspective view of an preferred embodiment of the adjustable angle cutting jig device 10 showing a rip fence guide 18, a first shank 20, a second shank 20, a first and a second cross member 22, a first rotating arm 24, a first threaded bolt 26, a second rotating arm 24, a cross brace 28, a first angle guide 30, a first wingnut 34, a second angle guide 30, a first and a second clamp 36, and a miter rail 38.

Figure 2:
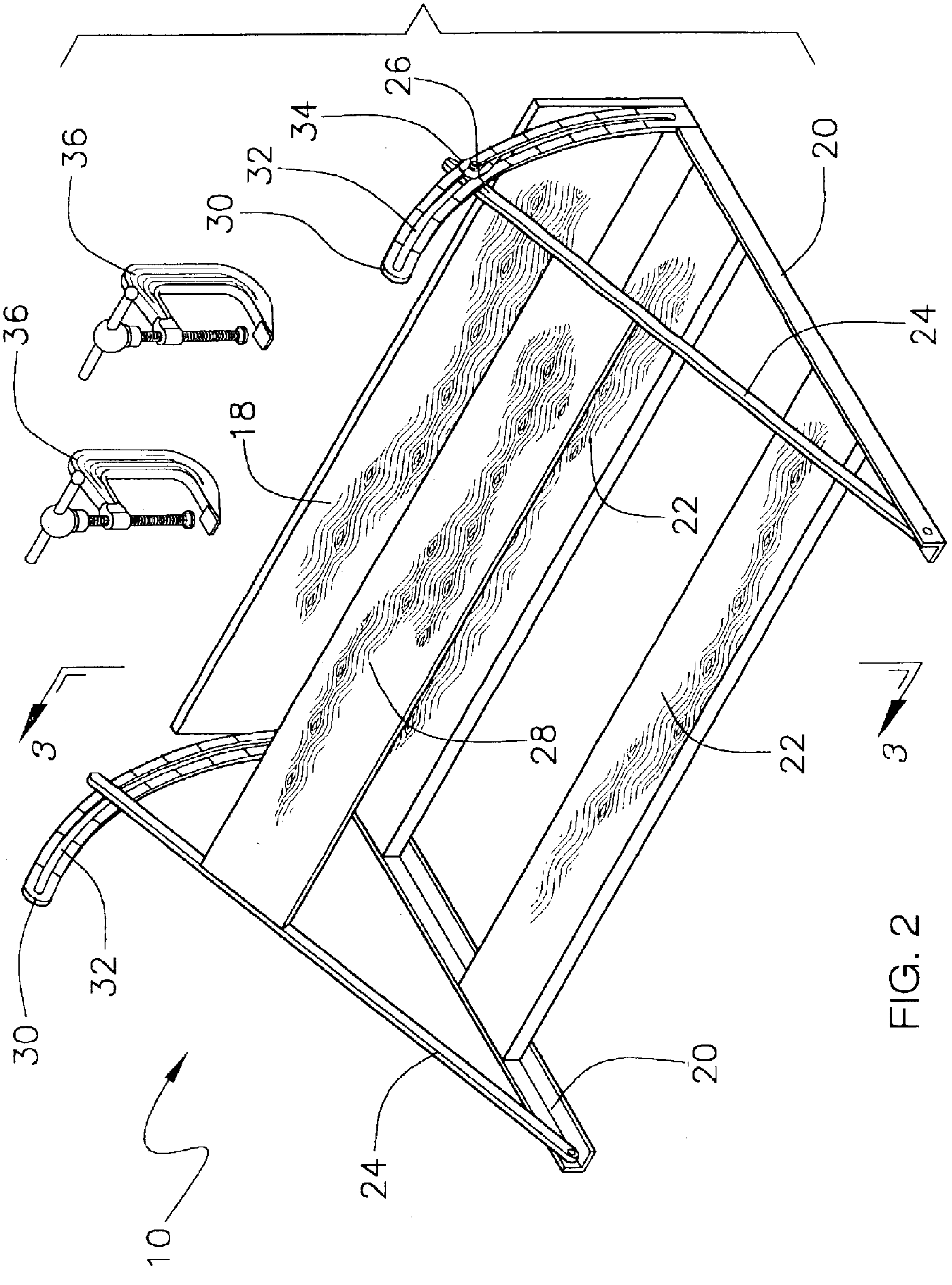
FIG. 2 is a perspective view of a preferred embodiment of the adjustable angle cutting jig device of the present invention.

Referring now to FIG. 2 which depicts a perspective view of a preferred embodiment of the adjustable angle cutting jig device 10 showing a rip fence guide 18, a first shank 20, a second shank 20, a first and a second cross member 22, a first rotating arm 24, a first threaded bolt 26, a second rotating arm 24, a cross brace 28, a first angle guide 30, a first wingnut 34, a second angle guide 30, a first clamp, and a second clamp 36.

Figure 3:
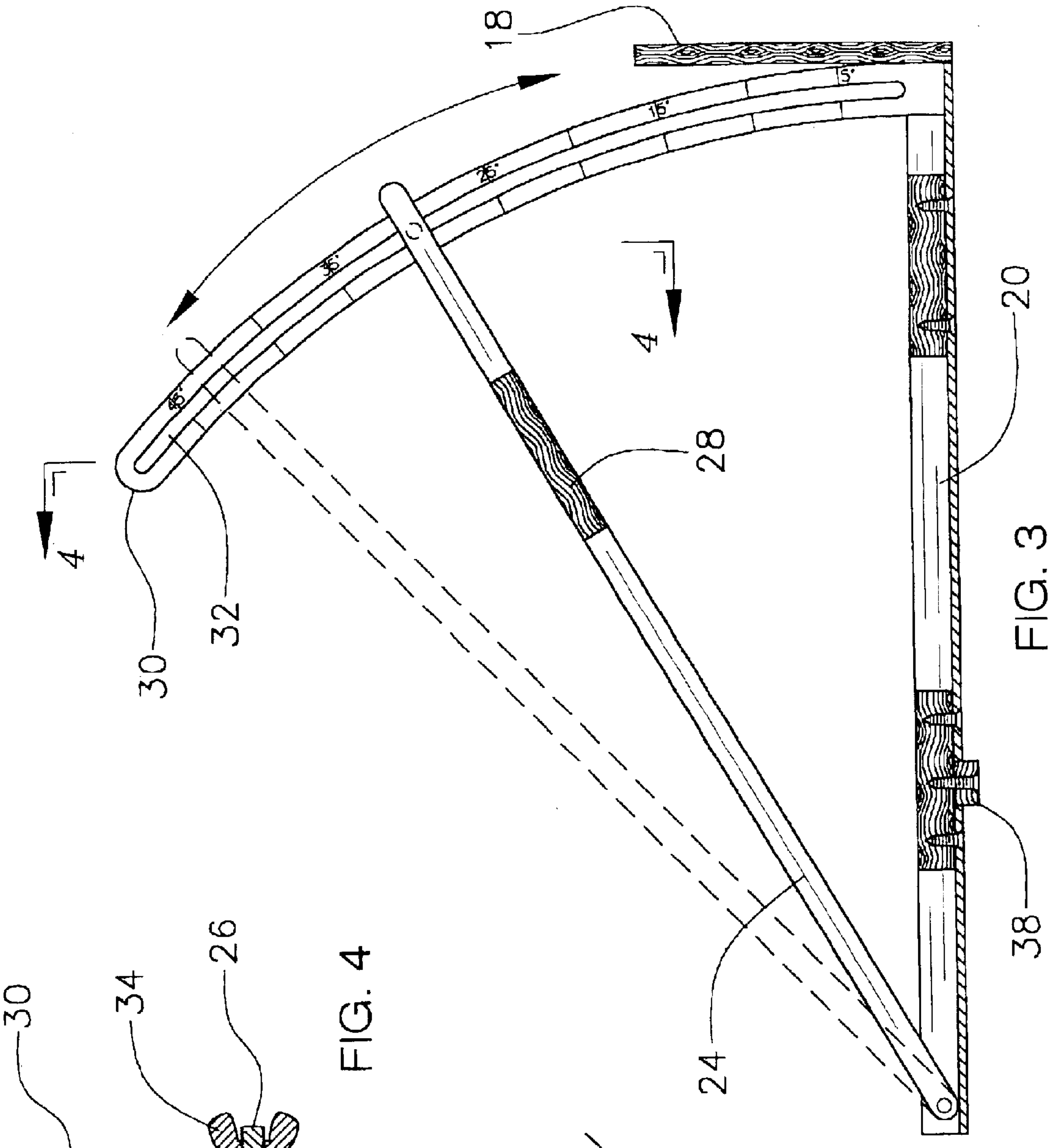
FIG. 3 is a cross sectional side view of a preferred embodiment of the adjustable angle cutting jig device of the present invention.

Referring now to FIG. 3 which depicts is a cross sectional side view of a preferred embodiment of the adjustable angle cutting jig device 10 showing a rip fence guide 18, a first shank 20, a first and a second cross member 22, a first rotating arm 24, a cross brace 28, a first angle guide 30, and a miter rail 38.

Figure 4:
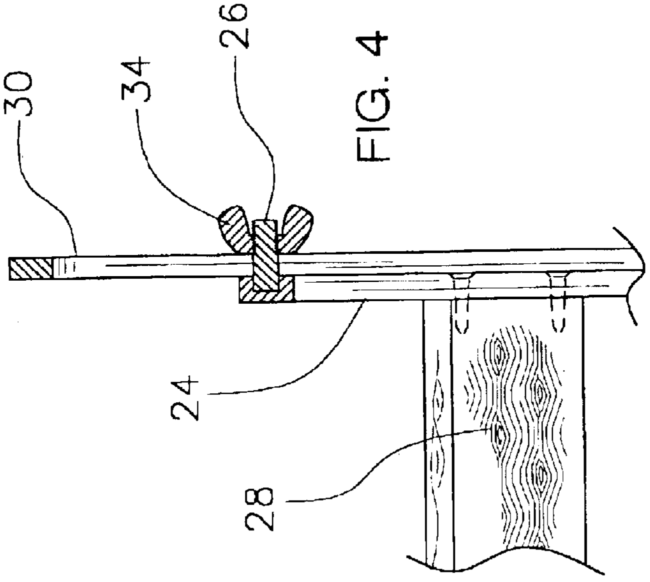
FIG. 4 is a cross sectional side view of a preferred embodiment of the adjustable angle cutting jig device of the present invention.

Referring now to FIG. 4 which depicts a cross sectional side view of a preferred embodiment of the adjustable angle cutting jig device 10 showing a first rotating arm 24, a first threaded bolt 26, a cross brace 28, a first angle guide 30, and a first wingnut 34.

As to the manner of usage and operation of the present invention, the same should be apparent from the above description. Accordingly, no further discussion relating to the manner of usage and operation will be provided.

While a preferred embodiment of the adjustable angle cutting jig device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of using an adjustable angle cutting jig device for use with a table saw having a circular blade, a rip fence and a miter grove, said method comprising the steps of:

obtaining the device consisting essentially of:

rip fence guide having a first end, a second end and a back surface;

a first shank having a distal end and a proximate end, the proximate end of the first shank is attached to the first end of the rip fence guide, the first shank and the rip fence guide are disposed substantially perpendicular to each other;

a second shank having a distal end and a proximate end, the proximate end of the second shank is attached to the second end of the rip fence guide, the second shank and the rip fence guide are disposed substantially perpendicular to each other, the first and second shanks are disposed substantially parallel to each other;

a first cross member attached to the first and second shanks;

a second cross member attached to the first and second shanks;

a first rotating arm having a distal end and a proximate end; the distal end of the first rotating arm is pivotally attached to the distal end of the first shank;

a first threaded bolt attached to the proximate end of the first rotating arm;

a second rotating arm having a distal end and a proximate end, the distal end of the second rotating arm is pivotally attached to the distal end of the second shank;

a second threaded bolt attached to the proximate end of the second rotating arm;

a cross brace attached to the first and second rotating arms, wherein the first and second rotating arms are disposed parallel to each other;

a first angle guide having a distal end, a proximate end and a first collar, the proximate end of the first angle guide is attached to the proximate end of the first shank, the first collar defining a first curved hole, wherein the first threaded bolt attached to the proximate end of the first rotating arm is slidably engaged within the first curved hole of the first angle guide;

a first wingnut threadedly attached to the first threaded bolt;

a second angle guide having a distal end, a proximate end and a second collar, the proximate end of the first angle guide is attached to the proximate end of the second shank, the second collar defining a second curve hole, wherein the second threaded bolt attached to the proximate end of the second rotating arm is slidably engaged within the second curved hole of the second angle guide;

a second wingnut threadedly attached to the second threaded bolt; and a first clamp;

a second clamp; and a miter rail attached to the cross member, the miter rail dimensioned to slidably fit within the miter groove of the table saw;

inserting the miter rail of the device into the miter groove of the table saw;

sliding the rip fence of the table saw against the rip fence guide of the device;

identifying a wooden board to be cut at a desired angle;

loosening the first wingnut from the first bolt so that the first rotating arm is free to pivot;

untightening the second wingnut from the second bolt so that the second rotating arm is free to pivot;

grabbing hold of the brace member when the first wingnut is loosened and when the second wingnut is untightened;

aligning pivotally the first rotating arm to the desired angle;

aligning pivotally the second rotating arm to the desired angle;

fastening the first wingnut to the first bolt when the first rotating arm is angled at the desired angle so that the proximate end of the first rotating arm is firmly secured to the first angle guide;

tightening the second wingnut to the second bolt when the second rotating arm is aligned at the desired angle so that the proximate end of the second rotating arm is firmly secured to the second angle guide;

raising the blade on the table saw;

placing the board flush onto the brace of the device;

adjoining securely the board flush onto the brace of the device with the first clamp;

affixing securely the board flush onto the brace of the device with the second clamp;

turning on the table saw so that the blade rotates;

pushing the device with the board adjoined and affixed securely to the brace when the miter rail of the device is inserted into the miter groove of the table saw and when the rip fence of the table saw is slid against the rip fence guide of the device; and cutting the board at the desired angle when the device is pushed.

2. An adjustable angle jig device for use with a table saw having a circular blade, a rip fence and a miter groove, said device comprising:

a rip fence guide having a first end, a second end and a back surface;

a first shank having a distal end and a proximate end, the proximate end of said first shank is attached to the first end of said rip fence guide, said first shank and said rip fence guide are disposed substantially perpendicular to each other;

a second shank having a distal end and a proximate end, the proximate end of said second shank is attached to the second end of said rip fence guide, said second shank and said rip fence guide are disposed substantially perpendicular to each other, said first and second shank are disposed substantially parallel to each other;

a cross member attached to said first and second shanks;

a first rotating arm having a distal end and a proximate end, the distal end of said first rotating arm is pivotally attached to the distal end of said fist shank, a first threaded bolt attached to the proximate end of said first rotating arm;

second rotating arm having a distal end and a proximate end, the distal end of said second rotating arm is pivotally attached to the distal end of said second shank;

a second threaded bolt attached to the proximate end of said second rotating arm;

a cross brace attached to said first and second rotating arms, wherein said first and second rotating arms are disposed parallel to each other;

a first angle guide having a distal end, a proximate end and a first collar, the proximate end of said first angle guide is attached to the proximate end of said first shank, said first collar defining a first curved here, wherein said first threaded bolt attached to the proximate end of said first rotating arm is slidably engaged within the first curved hole of said first angle guide;

a first wingnut threadedly attached to said first threaded bolt;

a second angle guide having a distal end, a proximate end and a second collar, the proximate end of said first angle guide is attached to the proximate end of said second shank, said second dollar defining a second curved hole, wherein said second threaded bolt attached to the proximate end of said second rotating arm is slidably engaged within the second curved hole of said second angle guide; and a second wingnut threadedly attached to said second threaded bolt.

3. The device of claim 2, further comprising a miter rail attached to said cross member, said miter rail dimensioned to slidably fit within the miter groove of the table saw.

4. The device of claim 2 further comprising a second cross member attached to said first and second shanks.

5. The device of claim 2 wherein said first angle guide having a first facade with a first plurality of angular demarcations embossed on said first facade.

6. The device of claim 2 wherein said second angle guide having a second facade with a second plurality of angular demarcations embossed on said second facade.

7. The device of claim 2 wherein said cross member is made of hardwood selected from the group consisting of ash, walnut, oak, maple, elm, cherry, and poplar.

8. The device of claim 2 wherein said cross brace is made of hardwood selected from the group consisting of ash, walnut, oak, maple, elm, cherry, and poplar.

9. The device of claim 2 wherein said rip fence guide is made of hardwood selected from the group consisting of ash, walnut, oak, maple, elm, cherry, and poplar.

10. An adjustable angle cutting jig device for use with a table saw having a circular blade, a rip fence and a miter groove, said device consisting essentially of:

a rip fence guide having a first end, a second end and a back surface;

a first shank having a distal end and a proximate end, the proximate end of said first shank is attached to the first end of said rip fence guide, said first shank and said rip fence guide are disposed substantially perpendicular to each other;

a second shank having a distal end and a proximate end, the proximate end of said second shank is attached to the second end of said rip fence guide, said second shank and said rip fence guide are disposed substantially perpendicular to each other, said first and second shank are disposed substantially parallel to each other;

a first cross member attached to said first and second shanks;

a second cross member attached to said first and second shanks;

a first rotating arm having a distal end and a proximate end, the distal end of said first rotating arm is pivotally attached to the distal end of said first shank, a first threaded bolt attached to the proximate end of said first rotating arm;

a second rotating arm having a distal end and a proximate end, the distal end of said second rotating arm is pivotally attached to the distal end of said second shank;

a second threaded bolt attached to the proximate end of said second rotating arm;

a cross brace attached to said first and second rotating arms, wherein said first and second rotating arms are disposed parallel to each other;

a first angle guide having a distal end, a proximate end and a first collar, the proximate end of said first angle guide is attached to the proximate end of said first shank, said first collar defining a first curved hole, wherein said first threaded bolt attached to the proximate end of said first rotating arm is slidably engaged within the first curved hole of said first angle guide;

a first wingnut threadedly attached to said first threaded bolt;

a second angle guide having a distal end, a proximate end and a second collar, the proximate end of said first angle guide is attached to the proximate end of said second shank, said second collar defining a second curved hole, wherein said second threaded bolt attached to the proximate end of said second rotating arm is slidably engaged within the second curved hole of said second angle guide;

a second wingnut threadedly attached to said second threaded bolt; and a first clamp attaching to said cross brace for securing a piece of material to said cross brace;

a second clamp attaching to said cross brace for securing a piece of material to said cross brace; and a miter rail attached to said cross member, said miter rail dimensioned to slidably fit within the miter groove of the table saw.

11. The device of claim 10 wherein said first clamp is selected from the group consisting of a C-clamp, a bar clamp, a vice clamp, a spring clamp, a ratchet clamp, and a pinch clamp.

12. The device of claim 10 wherein said second clamp is selected from the group consisting of a C-clamp, a bar clamp, a vice clamp, a spring clamp, a ratchet clamp, and a pinch clamp.

13. The device of claim 10 wherein said first angle guide having a first facade with a first plurality of angular demarcations embossed on said first facade.

14. The device of claim 10 wherein said second angle guide having a second facade with a second plurality of angular demarcations embossed on said second facade.

15. The device of claim 10 wherein said cross member is made of hardwood selected from the group consisting of ash, walnut, oak, maple, elm, cherry, and poplar.

16. The device of claim 10 wherein said first cross brace is made of hardwood selected from the group consisting of ash, walnut, oak, maple, elm, cherry, and poplar.

17. The device of claim 10 wherein said second cross brace is made of hardwood selected from the group consisting of ash, walnut, oak, maple, elm, cherry, and poplar.

18. The device of claim 10 wherein said rip fence guide is made of hardwood selected from the group consisting of ash, walnut, oak, maple, elm, cherry, and poplar.

* * * * *